(12) United States Patent
Mechaley, Jr.

(10) Patent No.: US 8,489,071 B2
(45) Date of Patent: Jul. 16, 2013

(54) SYSTEM AND METHOD FOR ASSURING IDENTITY ON A MOBILE DEVICE

(75) Inventor: Robert G. Mechaley, Jr., Kirkland, WA (US)

(73) Assignee: MobileSphere Holdings LLC, Kirkland, WA (US)

( * ) Notice: Subject to any disclaimer, the term of this patent is extended or adjusted under 35 U.S.C. 154(b) by 68 days.

(21) Appl. No.: 12/913,536

(22) Filed: Oct. 27, 2010

(65) Prior Publication Data

US 2012/0108203 A1  May 3, 2012

(51) Int. Cl.
*H04L 9/32* (2006.01)
*H04M 1/66* (2006.01)
*G06F 7/04* (2006.01)

(52) U.S. Cl.
USPC .............................. 455/411; 713/168; 726/7

(58) Field of Classification Search
USPC ............................... 455/411; 713/168; 726/7
See application file for complete search history.

(56) References Cited

U.S. PATENT DOCUMENTS

| | | | |
|---|---|---|---|
| 7,970,380 B2 * | 6/2011 | Laitinen ........................ | 455/411 |
| 2006/0121880 A1 * | 6/2006 | Cowsar et al. ................ | 455/406 |
| 2007/0073817 A1 | 3/2007 | Gorty | |
| 2008/0039085 A1 | 2/2008 | Phan-Anh | |
| 2008/0281737 A1 * | 11/2008 | Fajardo ........................... | 705/35 |
| 2009/0217033 A1 | 8/2009 | Costa et al. | |
| 2010/0017861 A1 * | 1/2010 | Krishnaswamy et al. ........ | 726/7 |
| 2011/0126010 A1 * | 5/2011 | Kim et al. ..................... | 713/168 |

FOREIGN PATENT DOCUMENTS

WO           03090027 A2     10/2003

OTHER PUBLICATIONS

Korean Intellectual Property Office: PCT International Search Report; May 16, 2012; Republic of Korea.

* cited by examiner

*Primary Examiner* — Kent Chang
*Assistant Examiner* — Ngan Pham Lu
(74) *Attorney, Agent, or Firm* — Michael J. Donohue; Davis Wright Tremaine LLP

(57) ABSTRACT

The identity of a mobile communication device can be authenticated to allow the device to access a web site without the need for a user log-in operation. The mobile device stores an identity token and sends it to the web server in the web browser data stream. Additionally, the mobile device transmits an identity token to an authentication entity using a data stream other than the web browser data. The authentication entity queries the wireless network to verify authentication of the mobile device. The identity token may be the mobile telephone number itself, a temporary mobile subscriber identity assigned by the mobile network, or encrypted or hashed versions of either. Alternatively, a new temporary mobile subscriber identity may be sent to the mobile device and retransmitted back to the authentication entity.

36 Claims, 3 Drawing Sheets

US 8,489,071 B2

SYSTEM AND METHOD FOR ASSURING IDENTITY ON A MOBILE DEVICE

BACKGROUND OF THE INVENTION

1. Field of the Invention

The present disclosure is directed generally to mobile devices and, more particularly, to techniques for assuring the identity of a mobile device.

2. Description of the Related Art

Mobile devices, such as cellular telephones, were originally analog devices useful for voice communications. New generations of digital devices, sometimes referred to as "smart phones," provide text messaging, multimedia communications, including video streaming, execution of sophisticated application programs, and web access, in addition to voice communication. When an individual accesses a website through a computer at home or at the office, the identity of the specific computer may often be determined automatically using known techniques. In some instances, a web server that the user accesses may require the entry of a user name and password to provide a greater assurance of identity.

With mobile applications, the entry of log-in information, such as a user name and password, can be a cumbersome process due to the small size of the mobile device. Therefore, it can be appreciated that there is a significant need for techniques that will assure the identity of a mobile device without requiring a log-in operation. The present disclosure provides this and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

The present disclosure is directed to techniques for identifying a mobile device in a manner that makes it difficult to "spoof" or impersonate the mobile device during a web session. Different variations disclosed herein will provide varying levels of security depending on the particular need of the user, and of the web server.

Figure 1:
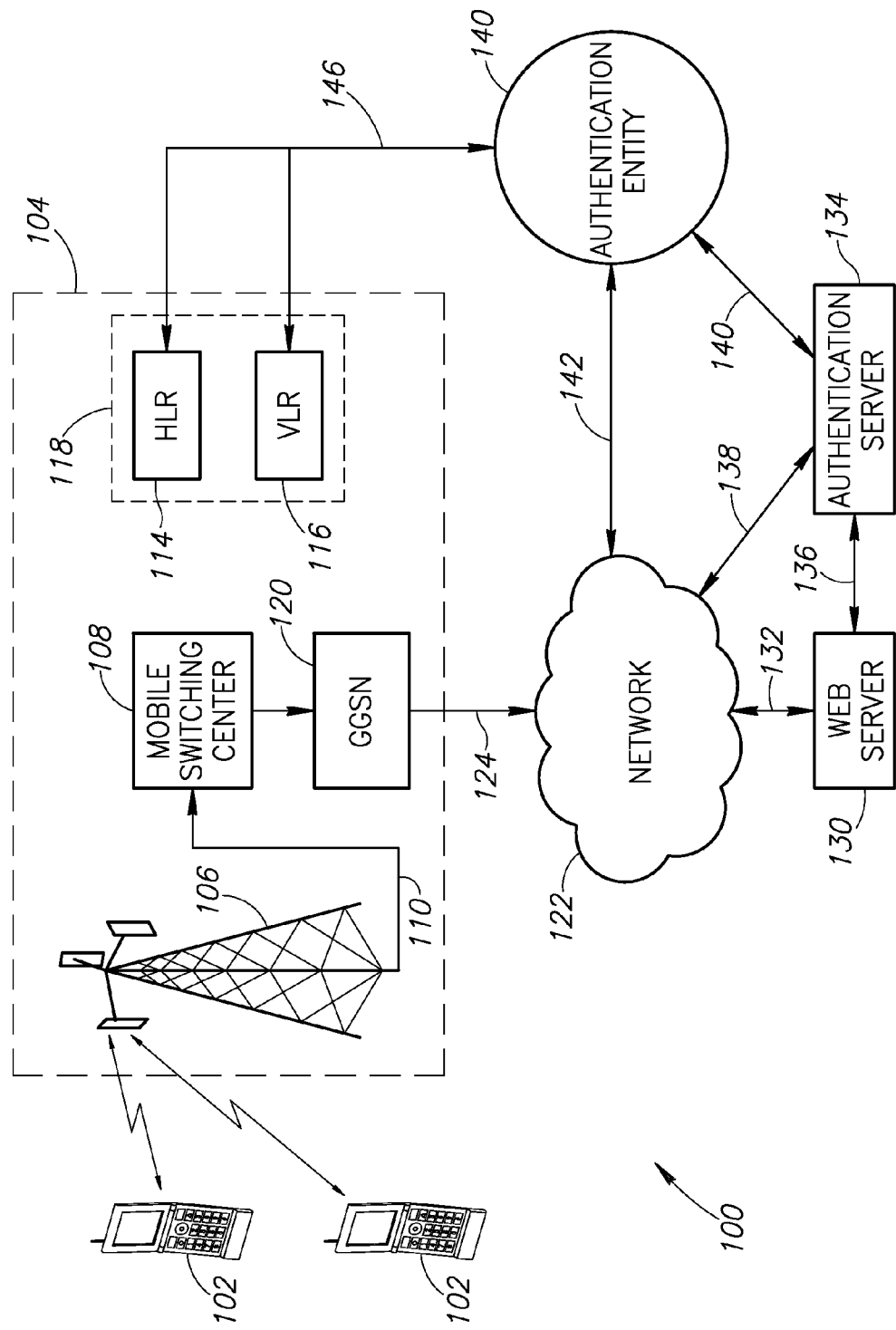
FIG. 1 illustrates a sample system architecture that may be used to implement various aspects of the present disclosure.

The teachings disclosed herein can be implemented, in one example embodiment, using the system architecture illustrated in FIG. 1. A system 100 in FIG. 1 operates with a plurality of mobile communication devices 102 that communicate with a public land mobile network (PLMN) 104. The mobile communication device 102 will be described in somewhat greater detail below. However, the mobile communication device 102 may be any conventional mobile device that has web access capability. The PLMN 104 is implemented, in the example of FIG. 1, as a mobile network constructed in accordance with GSM standards. While the example embodiment utilizes GSM functionality, those skilled in the art will appreciate that other communication protocols (e.g., OFDMA, CDMA, W-CDMA, 3G, 4G, LTE, and the like) have similar functionality and may be readily employed to implement the teachings of the present disclosure.

The PLMN 104 includes a base station 106 that communicates with a mobile switching center 108 via a backhaul communication link 110. In a typical mobile network, a large number of base stations 106 may be deployed throughout a geographic region of coverage, and each base station communicates with a large number of mobile communication devices 102. However, for the sake of clarity, the PLMN 104 in FIG. 1 has a single base station 106 and only two mobile communication devices 102.

The mobile communication device 102 communicates with the base station 106 in a conventional manner for operations such as voice communications, text messaging, and the like. Those processes are well known and need not be described in greater detail herein.

In the GSM implementation of the PLMN 104, the network includes a home location register (HLR) 114 and a visitor location register (VLR) 116. In early mobile systems, networks tended to be geographically limited. The mobile communication device 102 was initially assigned to a home location and user registration data was entered into the HLR 114. When the user operated the mobile communication device within that limited geographic region, the HLR 114 received identity data from the mobile communication device 102 during registration and used that information to retrieve data from the HLR 114. The data in the HLR 114 was used to authenticate the mobile communication device 102 to assure the identity of the device. For example, the data processed by the HLR 114 could determine whether the subscriber was still active or no longer a customer, to assure that the device was not reported stolen, and the like. Thus, the HLR 114 was used for identity verification and status.

When the user traveled out of the home region, the initial registration process occurs with the VLR 116. The VLR 116 may communicate with the HLR 114 through communication links (not shown) in the PLMN 104 to obtain the subscriber authentication data. The VLR 116 may perform a similar authentication process to that described above with respect to the HLR 114.

Current mobile networks are far more geographically expansive and users often retain the same mobile phone even after moving from one geographic location to another. Thus, the initial limited geographic concept involving the HLR 114 and VLR 116 has been greatly expanded. However, the basic functionality of the HLR 114 and VLR 116 to permit the identity authentication and status retrieval for the mobile communication device 102 is essentially the same as described above. For purposes of the present disclosure, the functionality of the HLR 114 and the VLR 116 may be combined into a single generic location register 118.

Upon initial registration with the PLMN 104, the mobile communication device 102 transmits various pieces of data, such as the user telephone number and an international mobile subscriber identity (IMSI) associated with the mobile communication device. That information is used in the authentication process described above. In most cases, the location register 118 will assign a temporary mobile subscriber identity (TMSI) to the mobile communication device 102 upon successful completion of the initial registration process. The TMSI is subsequently used by the mobile communication device instead of the mobile telephone number. In some embodiments, the PLMN 104 may periodically trigger a process to generate a new TMSI and send it to the mobile communication device 102 such that the mobile communication device 102 may be assigned multiple TMSI values over the course of time. In addition to the temporal generation of a new TMSI, the system 100 can generate a new TMSI based on the state of the mobile communication device 102. That is, the mobile communication device 102 may receive a new TMSI from the location register 118 when it changes to a new logical state. For example, movement of the mobile communication device 102 to a new geographic area or base station may trigger issuance of a new TMSI from the location register 118. In some cases, the mobile communication device 102 may have multiple TMSI values simultaneously. For example, the packet data system in the mobile communication device 102 may have a packet data TMSI in addition to the usual TMSI used for voice communication.

As noted above, modern mobile communication devices 102 have web access capabilities and are capable of executing sophisticated application programs. In the PLMN 104 illustrated in FIG. 1, web communication occurs using a general packet radio service (GPRS). In the PLMN 104 illustrated in FIG. 1, web access is provided via a gateway GPRS network (GGSN) 120.

In the example embodiment of FIG. 1, the GGSN 120 communicates with a network 122 via a communication link 124. Although a common implementation of the network 122 is the Internet, the system 100 may be implemented using the Internet, an intranet (e.g., a local area network), or any private data network. The system 100 is not limited to any particular implementation of the network 122. Those skilled in the art will appreciate that networks implemented using other communication protocols have similar functionality to allow the PLMN 104 to access the network 122.

FIG. 1 also illustrates a web server 130 that may typically host a website designed for access by, for example, the mobile communication device 102. The web server 130 is coupled to the network 122 via a communication link 132. The web server 130 typically includes an authentication function, which is illustrated in FIG. 1 as an authentication server 134. The authentication server 134 may be implemented as a function of the web server 130 and integrated therewith as a service or application. Alternatively, the authentication server may be implemented separately and communicate directly with the web server 130 via a communication link 136 or via the network 122 using a communication link 138 and the communication link 132. The authentication server 134 may provide conventional authentication functionality associated with the web server 130. For example, the authentication server 134 may query the user for a user identification and password (i.e., log-in information).

As noted above, a log-in process can be cumbersome to perform using the mobile communication device 102. The system 100 can eliminate the manual log-in process by automatically extracting an identity token from the mobile communication device 102 and providing the identity token to an authentication entity 140. The authentication entity 140 may communicate directly with the network 122 via a communication link 142. In this embodiment, the identity token is transmitted from the mobile communication device 102 to the PLMN 104 and relayed directly to the authentication entity 140 via the GGSN 120 and the network 122. Alternatively, the authentication entity 140 may be coupled to the authentication server 134 via a communication link 144. In this embodiment, the identity token may be transmitted from the mobile communication device 102 to the network 122 and relayed to the authentication server 134 for transmission to the authentication entity 140 via the communication link 144. In yet another alternative, the identity token may be transmitted from the web server 130 or the authentication server 134 to the authentication entity 140 via the network 122.

As will be described in greater detail below, the authentication entity 140 communicates with portions of the PLMN 104 to obtain authentication and status information regarding the mobile communication device 102. In the GSM embodiment of the PLMN 104 illustrated in FIG. 1, the authentication entity 140 communicates with the location register 118 via a communication link 146. The authentication entity 140 utilizes the identity token provided by the mobile communication device 102 to obtain the registration and status information for the mobile communication device.

Figure 2:
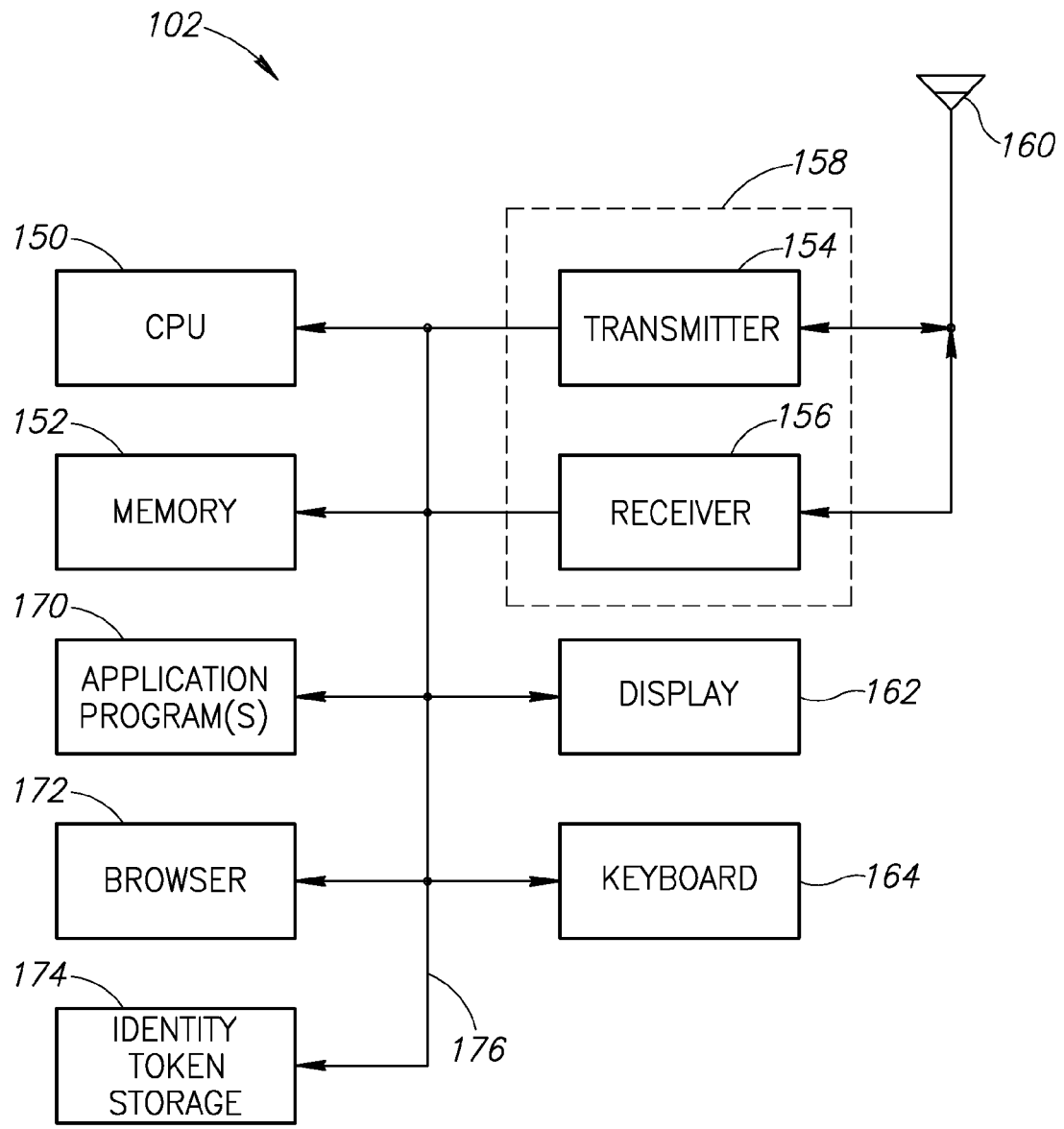
FIG. 2 is a functional block diagram of a mobile device operating in the system of FIG. 1.

FIG. 2 is a functional block diagram of the mobile communication device 102. The mobile communication device 102 includes a central processing unit (CPU) 150 and a memory 152. In general, the memory 152 contains data and instructions that are executed by the CPU 150. The CPU 150 may be implemented as a conventional microprocessor, microcontroller, digital signal processor, application specific integrated circuit, or the like. The mobile communication device 102 is not limited by the specific implementation of the CPU 150.

Similarly, the memory 152 may be implemented with a variety of known technologies. The memory 152 may include random access memory, read-only memory, programmable memory, and the like. In one embodiment, a portion of the memory 152 may be integrated into the CPU 150. The mobile communication device 102 is not limited by the specific form of the memory 152.

FIG. 2 also illustrates a transmitter 154 and receiver 156. In many implementations, the transmitter 154 and receiver 156 share common circuitry and are implemented as a transceiver 158. The transceiver 158 is coupled to an antenna 160. The transceiver 158 is illustrated in FIG. 2 as a generic device. Those skilled in the art will appreciate that the specific implementation of the transceiver 158 may depend on the particular PLMN 104 with which the mobile communication device 102 communicates. For example, the transceiver 158 in one mobile communication device 102 may be configured for operation in accordance with GSM standards while the transceiver 158 in a different mobile communication device may be configured for operation in accordance with CDMA or other communication protocols. However, as noted above, the system 100 may be readily implemented on mobile networks using various communication protocols and is not limited to any particular communication protocol.

In addition, the mobile communication device 102 includes a display 162 and keyboard 164. The display 162 may be a black and white or color display and, in some embodiments, may be a touch sensitive display. In this embodiment, the functionality of the keyboard 164 may be combined with the display 162. These devices operate in a conventional manner and need no further explanation regarding operational details.

The modern mobile communication device 102 can store and execute one or more application programs 170. The mobile communication device 102 also includes a browser 172. Those skilled in the art will appreciate that the browser 172 is another form of an application program, such as the application program 170, but is illustrated as a separate function in FIG. 2 because of the specialized nature of the browser. Those skilled in the art will also appreciate that the application program 170 may include some form of browser functionality that is integrated into the application program.

The mobile communication device 102 also includes an identity token storage area 174. As will be described in greater detail below, the identity token storage area 174 stores one or more forms of identity tokens that will be used to authenticate the mobile communication device 102.

The various components in FIG. 2 are coupled together by a bus system 176. The bus system 176 may include an address bus, data bus, control bus, power bus, and the like. For the sake of clarity, those various busses are illustrated in FIG. 2 as the bus system 176.

Those skilled in the art will appreciate that many of the blocks illustrated in the functional block diagram of FIG. 2 may comprise a set of software instructions stored in the memory 152 and executed by the CPU 150. For example, the application programs 170 and browser 172 are typically implemented as a set of software instructions. Similarly, the identity token storage 174 may be a portion of the memory 152. However, these are illustrated as separate blocks in the functional block diagram of FIG. 2 because each performs a separate function.

The authentication entity 140 is illustrated in the functional block diagram of FIG. 1 as a separate process coupled to the network 122 via the communication link 142. While such an implementation is commonplace in a distributed network, those skilled in the art will appreciate that the authentication entity 140 may be associated with the web server 130. The authentication entity 140 may be implemented as part of the web server 130 and integral therewith or implemented as part of the authentication server 134 and integral therewith. Alternatively, the authentication entity 140 may be a separate computing device coupled to the web server 130 and/or the authentication server 134 via a connection, such as a local area network, or via a wide area network, such as the Internet. In yet another alternative embodiment, the authentication entity may be implemented as part of the PLMN 104 and located on a node within that network.

Figure 3:
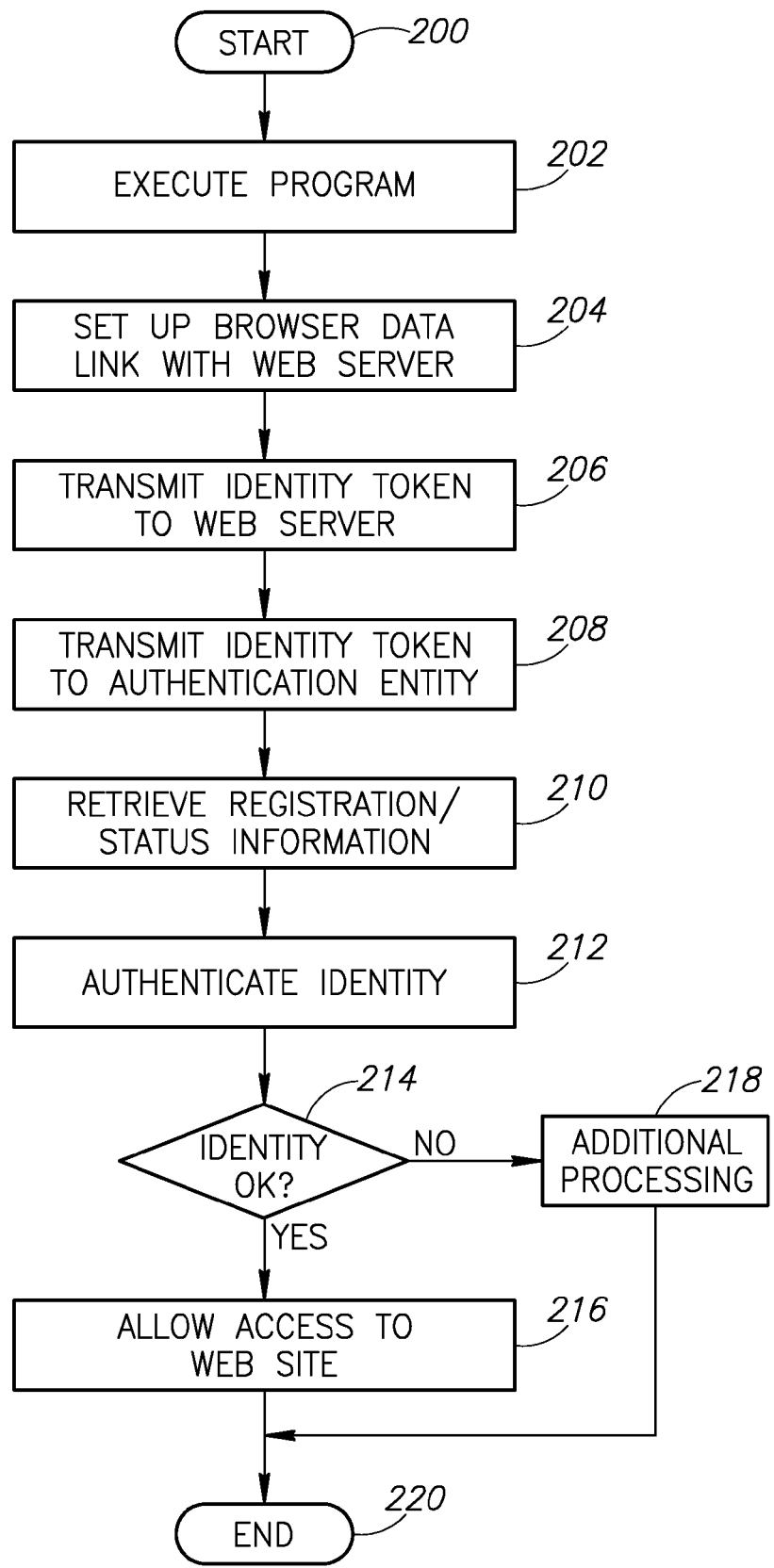
FIG. 3 is a flow chart illustrating the operation of an embodiment of the present disclosure.

The authentication process is illustrated, in one embodiment, in the flowchart of FIG. 3. At a start 200, the various components illustrated in the example architecture of FIG. 1 are coupled together. Those skilled in the art will appreciate that the mobile communication device 102 performs an initial registration with the PLMN 104. This may occur when the mobile communication device 102 is first powered up or when the mobile communication device switches from one base station (not shown) to the base station 106. As part of the registration process, the mobile communication device may receive a TMSI for subsequent use during the communication session. As previously discussed, the PLMN 104 may generate a new TMSI at a predetermined interval. In addition, the PLMN 104 may generate a new TMSI based on the logical state of the mobile communication device 102.

At step 202, the mobile communication device 102 executes a program. The program may be an application program 170 (see FIG. 2) or activation of the browser 172. In the example illustrated herein, execution of the program in step 202 will require access to the network 122 via the GGSN 120.

The mobile communication device 102 accesses the web server 130 via the network 122, by transmitting a web address, typically referred to as a uniform resources locator (URL), to the network. In its communication with the web server 130, the mobile communication device will transmit an identity token from the identity token storage 174 (see FIG. 2) in step 204.

In an exemplary embodiment, the identity token may be stored in the identity token storage 174 (see FIG. 2) as a name-value pair. Those skilled in the art will recognize that name-value pairs are commonly stored in computer devices as "cookies." The use of cookies is ubiquitous in web surfing and need not be explained in great detail. In the system 100, the identity token (e.g., the cookie) is typically stored as text data in the identity token storage 174. The "name" in the name-value pair is typically some name recognized by the web server 130, such as a session ID, website name and/or address, or the like. The name may be created by the web server 130 and is recognizable by the web server. The "value" in the name-value pair is a unique user identification. In the system 100, the value data in the name-value pair can be implemented as the telephone number associated with the mobile communication device 102. As will be described in greater detail below, other values for the name-value pair may be used to provide greater levels of security.

In a typical web surfing session with a conventional computer, navigation to a website will cause the conventional computer to transmit any cookies associated with that website. That is, the computing device transmits the cookies to the web server as part of HTTP headers during the early data exchanges with the web server. The web server extracts the name-value pair and may use it for its own purposes. For example, a shopping website can use the cookie to retrieve its own data related to the user's last shopping experience, list of recently purchased products, user interests, or the like. The cookies are generally intended to enhance the user experience by customizing web pages presented to the user.

In the mobile communication device 102, the name value-pair is used in the identity authentication process. When the mobile communication device 102 initially accesses the web server 130, it transmits the name-value pair associated with the web server in HTTP headers, as is common when a conventional computer accesses the web site.

In one embodiment, each web server 130 on the network 122 may create its own name-value pair for storage on the mobile communication device 102. When the mobile communication device 102 accesses a particular web server (e.g., the web server 130), that web server will request its own unique name-value pair. Alternatively, there is some degree of de facto standardization in the industry for name-value pairs. The mobile communication device 102 may store a generic name-value pair for identity authentication purposes. In this embodiment, the name portion of the name-value pair may be generic, such as "mobile authentication," while the data value in the name-value is a unique identifier. In this manner, the mobile communication device 102 can transmit the generic name for the name-value pair for identity authentication purposes.

As part of the data link set-up between the browser and the web server 130 in step 204, the mobile communication device 102 transmits the identity token (e.g., the name-value pair) to the web server 130 and/or the authentication server 134 in step 206. As discussed above, the identity token may be transmitted as part of an HTTP header sent to the web server 130 using the browser data stream between the mobile communication device 102 and the web server. As noted above, the identity token transmitted from the mobile communication device to the web server 130 may be the mobile telephone number, a TMSI, a combination of multiple TMSI values or the like.

In a parallel independent process, a listener function within the application program 170 or browser 172 monitors transmissions from the mobile communication device 102 to the web server 130. When the listener function detects the transmission of an identity token to the web server 130, the mobile communication device 102 also transmits the identity token to the authentication entity 140 (see FIG. 1) in step 208. This process may occur outside the browser data stream established between the mobile communication device 102 and the web server 130. In one embodiment, the identity token transmitted from the mobile communication device to the authentication entity 140 may be the same as the identity token transmitted from the mobile communication device to the web server 130. Alternatively, the identity tokens may be different, as will be discussed in greater detail below.

In step 210, the authentication entity 140 retrieves registration/status information for the mobile communication device 102 associated with the received identity token. In an exemplary embodiment, the authentication entity 140 contacts the location register 118 in the PLMN 104 to request authentication information. The authentication entity 140 can transmit the mobile telephone number received from the web server 130 or other form of identity token received from the web server. The authentication entity 140 may also use the identity token received directly from the mobile communication device 102 in addition to, or in place of, the data received from the web server. This data is transmitted to the location register 118 of the PLMN 104. While the location register 118 is a common component in a GSM network, those skilled in the art will appreciate that similar functionality is provided in other forms of mobile communication networks.

The location register 118 provides authentication information in response to the request and data received from the authentication entity 118. The authentication information may, for example, indicate that the identity token is associated with a valid user account. The location register 118 may also provide status information, such as an indication that the mobile communication device 102 is currently communicating with the PLMN 104. The location register 118 can also provide negative information, such as an indication that the identity token is not associated with any valid mobile communication device 102. A negative response may also result if the mobile communication device 102 was reported stolen or is associated with an inactive account. Those skilled in the art will appreciate that other positive or negative results for the authentication processes may also be generated by the PLMN 104.

In step 212, the authentication entity 140 (see FIG. 1) authenticates the identity of the mobile communication device 102. This process may be simply acknowledging a positive or negative response from the location register 118. In another exemplary embodiment, the location register 118 may simply return current authentication information associated with the identity token provided by the authentication entity 140. In this embodiment, the authentication entity 140 analyzes the response from the PLMN 104 with respect to the identity token previously received from the mobile communication device 102 or the identity token transmitted from the authentication server 134 to the authentication entity 140.

In decision 214, the authentication entity 140 determines whether the identity has been authenticated. If the identity is OK, the result of decision 214 is YES and, in step 216, the web server 130 allows access to the website without the need for a log-in process by the user of the mobile communication device 102. If the identity is not OK, the result of decision 214 is NO. In that event, the system 100 requires additional processing in step 218. One form of the additional processing is simply to deny access to the web server 130 by the mobile communication device 102. This additional processing may occur if the authentication entity 140 has determined that the mobile communication device is stolen or associated with an inactive account, or the like. Alternatively, the additional processing in step 218 may take the form of instructions to the web server 130 to request a user log-in operation. This form of additional processing may occur, for example, if the user has purchased a new mobile communication device. If this is the first time the user has used a particular mobile communication device 102 to access the web server 130, the system 100 may store the authentication data for subsequent use. That is, the identity token may be stored in the identity token storage 174 (see FIG. 2) of the mobile communication device 102. In this matter, the mobile communication device 102 may be automatically authenticated in the manner described above. Following the access to the website in step 216 or additional processing in step 218, the system ends at step 220 having automatically completed an identity authentication process that is transparent to the user.

The process described above provides basic identity authentication. It is advantageous in that user names and passwords do not need to be stored on the mobile communication device 102. In this regard, the user has the convenience of not having to type in user name and password when visiting a website, but also receives the advantage of not storing sensitive user names and passwords in the mobile communication device 102 and not transmitting this information over a wireless communication link.

In the embodiment described above, the name-value pair contains the phone number associated with the mobile communication device 102. In an alternative embodiment, greater security may be provided by providing an identity token other than the mobile telephone number. As described above, the web server 130 queries the mobile communication device 102 to request a name-value pair associated with the web server 130 and stored on the mobile communication device. In the embodiment described above, the mobile communication device 102 transmits the name-value pair to the web server 130 as part of its response to the query. In an alternative embodiment, the query from the web server 130 triggers the mobile communication device 102 to obtain the TMSI temporarily assigned to the mobile communication device. In one version of this embodiment, the TMSI is transmitted to the web server 130 and/or the authentication server 134 in response to the query from the web server 130. As previously discussed, identity token (now in the form of the TMSI) is transmitted as part of a data header in the browser data stream. In a parallel process, the mobile communication device 102 also transmits the TMSI to the authentication entity 140 via the GGSN 120 in the network 122. The authentication entity 140 operates in a manner discussed above with respect to the mobile telephone number, but instead uses the TMSI as the identity token.

In a second version of this embodiment, the response from the mobile communication device 102 to the web server 130 (and authentication server 134) contains the name-value pair, including the mobile telephone number. Thus, the web server 130 receives only the telephone number associated with the mobile communication device 102 in a data header as part of the browser data stream. At the same time, the mobile communication device 102 transmits only the TMSI to the authentication entity 140 in a data stream different from the browser data stream. The authentication entity 140 will already have the TMSI for the mobile communication device 102 because it is constantly updated by the location register 118 of the PLMN 104. If the authentication entity 140 does not already have the current TMSI, it can query the PLMN 104 to retrieve the TMSI associated with the mobile communication device 102. The web server 130 and/or authentication server 134 forwards only the telephone number associated with the mobile communication device 102. The authentication entity 140 verifies that the TMSI received from the mobile communication device 102 matches the TMSI assigned to the mobile communication device identified by the telephone number to assure a match. Thus, the web server 130 receives only the telephone number associated with the mobile communication device while the authentication entity 140 receives the TMSI separately from the mobile communication device. Since the TMSI is dynamically assigned to the mobile communication device 102 by the location register 118, it is unlikely that the TMSI can be mimicked by unauthorized mobile communication devices. Thus, the TMSI provides a higher level of security that a system that only uses the telephone number associated with the mobile communication device 102. In addition, greater security is provided by virtue of the web server receiving only the telephone number rather than the telephone number and the TMSI.

In yet another alternative embodiment with greater security, the mobile communication device 102 can transmit the mobile telephone number or the TMSI to the web server 130 using the browser data stream and transmit the mobile telephone number or TMSI to the authentication entity 140 using a data stream other than the browser data stream, as described above. However, in this embodiment, the authentication entity 140 triggers the location register 118 to issue a new TMSI to the mobile communication device. The new TMSI is sent to the mobile communication device 102 via the PLMN 104 in a conventional manner. The new TMSI is sent to the mobile communication device 102 and echoed back to the authentication entity 140. Thus, the new TMSI is issued only upon specific request from the authentication entity 140. The authentication entity 140 also receives the new TMSI directly from the location register 118 and compares it with the TMSI echoed back from the mobile communication device 102. This alternative embodiment provides even greater security by requiring the generation of a new TMSI specifically in response to the identity authentication request from the authentication entity 140. Those skilled in the art will appreciate that the TMSI is a temporary identity which is changed by the PLMN 104 during initial phone registration, upon a change in status, change in base station, changed periodically, or changed as the result of a specific request, such as a request by the authentication entity 140, as described above. Because of the temporary nature of the TMSI, it is very difficult to track the identity of a mobile communication device 102 by an unscrupulous individual.

As noted above, the mobile communication device 102 may be assigned multiple TMSI values during the course of the communication session. In some embodiments, there can be multiple temporary identities for the mobile communication device 102. In yet another embodiment of the system 100, the multiple TMSI values can be used individually or in combination. For example, the GSM embodiment of the PLMN 104 (see FIG. 1) utilizes a P-TMSI, which is a temporary identity for packet data purposes. Other mobile networks utilizing different communication standards have similar functionality. Thus, the mobile communication device 102 may use different ones of the multiple TMSI values. Furthermore, the mobile communication device 102 may combine the multiple TMSI values to provide additional security. For example, the multiple TMSI values can be mathematically manipulated to produce a result that relies on knowing each of the multiple TMSI values. The authentication entity 140 also knows the multiple TMSI values and can provide authentication when the mathematically manipulated identity token is transmitted thereto. This embodiment provides even greater security because no actual TMSI value is transmitted.

In yet another variation, one or more of the multiple TMSI values may be used to generate a temporary encryption key for data communication using the combination of two or more temporary identities.

Those skilled in the art will appreciate that other security measures may also be employed. For example, the telephone number of the mobile communication device 102 may be encrypted in a manner that can only be decrypted by authentication entity 140. Alternatively, the TMSI may be encrypted whether it is a TMSI originally assigned to the mobile communication device 102 or a TMSI generated by the PLMN 104 in response to a request by the authentication entity 140. Similarly, secure hashing of the telephone number or the TMSI wherein the authentication entity 140 can reverse the hash to recover the original identity token (i.e., the telephone number or the TMSI).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for identity authentication of a mobile communication device having a mobile telephone number associated therewith, comprising:

activating a browser function in the mobile communication device to access a web server on a computer network;

communicating with the web server via a browser data stream;

within the mobile communication device, detecting transmission of a first identity token from the mobile communication device to the web server via the browser data stream and, in response to the transmission of the first identity token, the mobile communication device transmitting a second identity token to an authentication entity using a data stream different from the browser data stream; and using the first and second identity tokens to verify the authentication of the mobile communication device.

2. The method of claim 1, further comprising the web server using the authentication of the mobile communication device to determine whether or not to permit the mobile communication device to access the web server without performing a log-in operation.

3. The method of claim 1 wherein the first and second identity tokens are the mobile telephone number associated with the mobile communication device and verifying the authentication of the communication device comprises transmitting the mobile telephone number to a public land mobile network.

4. The method of claim 3 wherein verifying the authentication of the mobile communication device comprises using data from a location register of the public land mobile network.

5. The method of claim 3 wherein verifying the authentication of the mobile communication device comprises encrypting the mobile telephone number and transmitting the encrypted mobile telephone number from the mobile communication device to the authentication entity.

6. The method of claim 1, further comprising activating an application software program on mobile communication device, the application program causing the activation of the browser function.

7. The method of claim 1 wherein the web server requires an initial log-in process when the mobile communication device accesses the web server a first time, the mobile communication device storing the first identity token in a storage area of the mobile communication device for use when the mobile communication device accesses the web server at a second time subsequent to the first time.

8. The method of claim 7 wherein the first identity token is stored as a name-value pair in the storage area of the mobile communication device.

9. The method of claim 1, further comprising using a temporary mobile subscriber identity obtained from a public land mobile network, the mobile communication device transmitting the temporary mobile subscriber identity to the authentication entity as the second identity token.

10. The method of claim 9 wherein verifying the authentication of the mobile communication device comprises encrypting the temporary mobile subscriber identity and transmitting the encrypted temporary mobile subscriber identity to the authentication entity to permit the authentication entity to decrypt the encrypted temporary mobile subscriber identity and thereby recover the temporary mobile subscriber identity.

11. The method of claim 9 wherein verifying the authentication of the mobile communication device comprises creating a hash of the temporary mobile subscriber identity and transmitting the hashed temporary mobile subscriber identity to the authentication entity to permit the authentication entity to reverse the hashed temporary mobile subscriber identity and thereby recover the temporary mobile subscriber identity.

12. The method of claim 1, further comprising requesting a new temporary mobile subscriber identity from the public land mobile network in response to receiving the temporary mobile subscriber identity from the mobile communication device, the mobile communication device receiving the new temporary mobile subscriber identity and transmitting the new temporary mobile subscriber identity to the authentication entity as the second identity token.

13. The method of claim 12, further comprising updating the authentication entity to provide the new temporary mobile subscriber identity to the authentication entity.

14. The method of claim 1 wherein the mobile communication device is assigned a plurality of temporary mobile subscriber identities and the first identity token is a combination of at least two of the plurality of temporary mobile subscriber identities.

15. The method of claim 1 wherein the mobile communication device is assigned a plurality of temporary mobile subscriber identities and the second identity token is a combination of at least two of the plurality of temporary mobile subscriber identities.

16. A method for identity authentication of a mobile communication device having a mobile telephone number associated therewith, comprising:

receiving the mobile telephone number from the mobile communication device via a web server, the web server having received the mobile telephone number via a browser data stream formed between the web server and the mobile communication device and transmitted from the mobile communication device in response to sending the mobile telephone number to the web browser via the browser data stream;

receiving an identity token from the mobile communication device via a data stream other than the browser data stream, the identity token being associated with the mobile communication device;

using the identity token associated with the mobile communication device to request authentication information related to the mobile communication device from a public mobile telephone network;

using the identity token to verify the authentication of the mobile communication device; and providing authentication information related to the authentication to the web server.

17. The method of claim 16, further comprising the web server using the authentication information to determine whether or not to permit the mobile communication device to access the web server without performing a log-in operation.

18. The method of claim 16 wherein the identity token is the mobile telephone number associated with the mobile communication device.

19. The method of claim 16 wherein the identity token received from the mobile communication device is encrypted and using the identity token associated with the mobile communication device to request authentication information comprises using the encrypted identity token associated with the mobile communication device to request authentication information.

20. The method of claim 16 wherein the identity token is encrypted and using the identity token associated with the mobile communication device to request authentication information comprises decrypting the identity token received from the mobile communication device and using the decrypted identity token associated with the mobile communication device to request authentication information.

21. The method of claim 16 wherein the identity token is a temporary mobile subscriber identity associated with the mobile communication device and using the identity token associated with the mobile communication device to request authentication information comprises using the temporary mobile subscriber identity associated with the mobile communication device to request authentication information.

22. The method of claim 21, further comprising:
requesting a new temporary mobile subscriber identity from the public land mobile network in response to receiving the temporary mobile subscriber identity from the mobile communication device;
transmitting the new temporary mobile subscriber identity to the mobile communication device;
receiving the new temporary mobile subscriber identity back from the mobile communication device; and
using the new temporary mobile subscriber identity associated with the mobile communication device to request authentication information.

23. An article of manufacture including a computer-readable medium having instructions stored therein that, if executed by a computing device, causes the computing device to perform operations comprising:
activating a browser function in a mobile communication device to access a web server on a computer network;
communicating with the web server via a browser data stream;
transmitting a first identity token to the web server using the browser data stream;
upon transmitting the first identity token, transmitting a second identity token to an authentication entity using a data stream different from the browser data stream; and
communicating with the web server without having to perform a log-in process if the authentication entity verifies authentication of the mobile communication device.

24. The article of manufacture of claim 23 wherein the first and second identity tokens are the same.

25. The article of manufacture of claim 23 wherein the first identity token is a mobile telephone number of the mobile communication device.

26. The article of manufacture of claim 23 wherein the second identity token is a temporary mobile subscriber identification assigned to the mobile communication device.

27. The article of manufacture of claim 23 wherein the mobile communication device is assigned a plurality of temporary mobile subscriber identities and the first identity token is a combination of at least two of the plurality of temporary mobile subscriber identities.

28. The article of manufacture of claim 23 wherein the mobile communication device is assigned a plurality of temporary mobile subscriber identities and the second identity token is a combination of at least two of the plurality of temporary mobile subscriber identities.

29. A system for the authentication of a mobile communication device having a mobile telephone number associated therewith, the system comprising:
a public mobile network having a plurality of base stations and configured to communicate with the mobile communication device using at least one of the base stations;
a web server coupled to a computer network;
a network gateway coupled to the public mobile network and to the computer network, the gateway configured to permit the mobile communication device to communicate with the web server via the computer network using a browser data stream;
an authentication entity communicatively coupled to the web server and to the mobile communication device wherein the authentication entity is configured to receive an identity token from the mobile communication device transmitted to the web server using the browser data stream and to receive the identity token from the mobile communication device transmitted from the mobile communication device, in response to sending the identity token using the browser data stream, to the authentication entity using a data stream other than the browser data stream, the authentication entity being further configured to use the received identity tokens to communicate with the mobile network and thereby obtain authentication data.

30. The system of claim 29 wherein the identity token is the mobile telephone number associated with the mobile communication device.

31. The system of claim 29 wherein the mobile communication device is configured to encrypt the identity token, the authentication entity using the encrypted identity token to communicate with the mobile network and thereby obtain authentication data.

32. The system of claim 29 wherein the mobile communication device is configured to encrypt the identity token and the authentication entity is further configured to decrypt the encrypted identity token and to use the decrypted identity token to communicate with the mobile network and thereby obtain authentication data.

33. The system of claim 29 wherein the identity token is a temporary mobile subscriber identity associated with the mobile communication device.

34. The system of claim 33 wherein the authentication entity is configured to receive the temporary mobile subscriber identity associated with the mobile communication device using the data stream other than the browser data stream and, upon receipt of the temporary mobile subscriber identity, to request a new
temporary mobile subscriber identity associated with the mobile communication device from the mobile network, the mobile communication device transmitting the new temporary mobile subscriber identity to the authentication entity wherein the authentication entity is further configured to use the new temporary mobile subscriber identity to communicate with the mobile network and thereby obtain authentication data.

35. The system of claim 29 wherein the mobile communication device is assigned a plurality of temporary mobile subscriber identities and the first identity token is a combination of at least two of the plurality of temporary mobile subscriber identities.

36. The system of claim 29 wherein the mobile communication device is assigned a plurality of temporary mobile subscriber identities and the second identity token is a combination of at least two of the plurality of temporary mobile subscriber identities.

* * * * *